United States Patent [19]

Ratner et al.

[11] Patent Number: 4,988,921
[45] Date of Patent: Jan. 29, 1991

[54] LAMP WITH INTEGRAL AUTOMATIC LIGHT CONTROL CIRCUIT

[75] Inventors: Elizabeth L. Ratner, Lowell; David H. Fox, Beverly, both of Mass.

[73] Assignee: GTE Products Corporation, Danvers, Mass.

[21] Appl. No.: 295,188

[22] Filed: Jan. 9, 1989

[51] Int. Cl.⁵ .............................. H05B 37/02
[52] U.S. Cl. ................... 315/159; 315/51; 315/52; 315/53; 315/71; 315/73
[58] Field of Search .................. 315/51, 52, 53, 71, 315/73, 159

[56] References Cited

U.S. PATENT DOCUMENTS

| | | | |
|---|---|---|---|
| D. 288,967 | 3/1987 | Naft | D26/26 |
| 4,547,704 | 10/1985 | Brinn et al. | 315/71 |
| 4,588,926 | 5/1986 | Pezzolo | 315/155 |
| 4,652,980 | 3/1987 | Segan | 362/86 |
| 4,697,122 | 9/1987 | Hoffer | 315/158 |

Primary Examiner—Eugene R. LaRoche
Assistant Examiner—Do Hyun Yoo
Attorney, Agent, or Firm—Wolf, Greenfield & Sacks

[57] ABSTRACT

A lamp assembly includes a sealed lamp envelope enclosing a filament, a lamp base affixed to the lamp envelope and including a connector, and an automatic light control circuit located in the lamp base and electrically connected between the connector and the filament. The light control circuit includes a photosensor for controlling the power delivered to the filament in response to a sensed ambient light level. Preferably, the lamp base includes a cup-shaped portion affixed to the connector, and the light control circuit is mounted in the cup-shaped portion on a circuit board. The photosensor is mounted in a hole in a sidewall of the cup-shaped portion. The lamp assembly can be installed and operated in a conventional lamp socket.

7 Claims, 1 Drawing Sheet

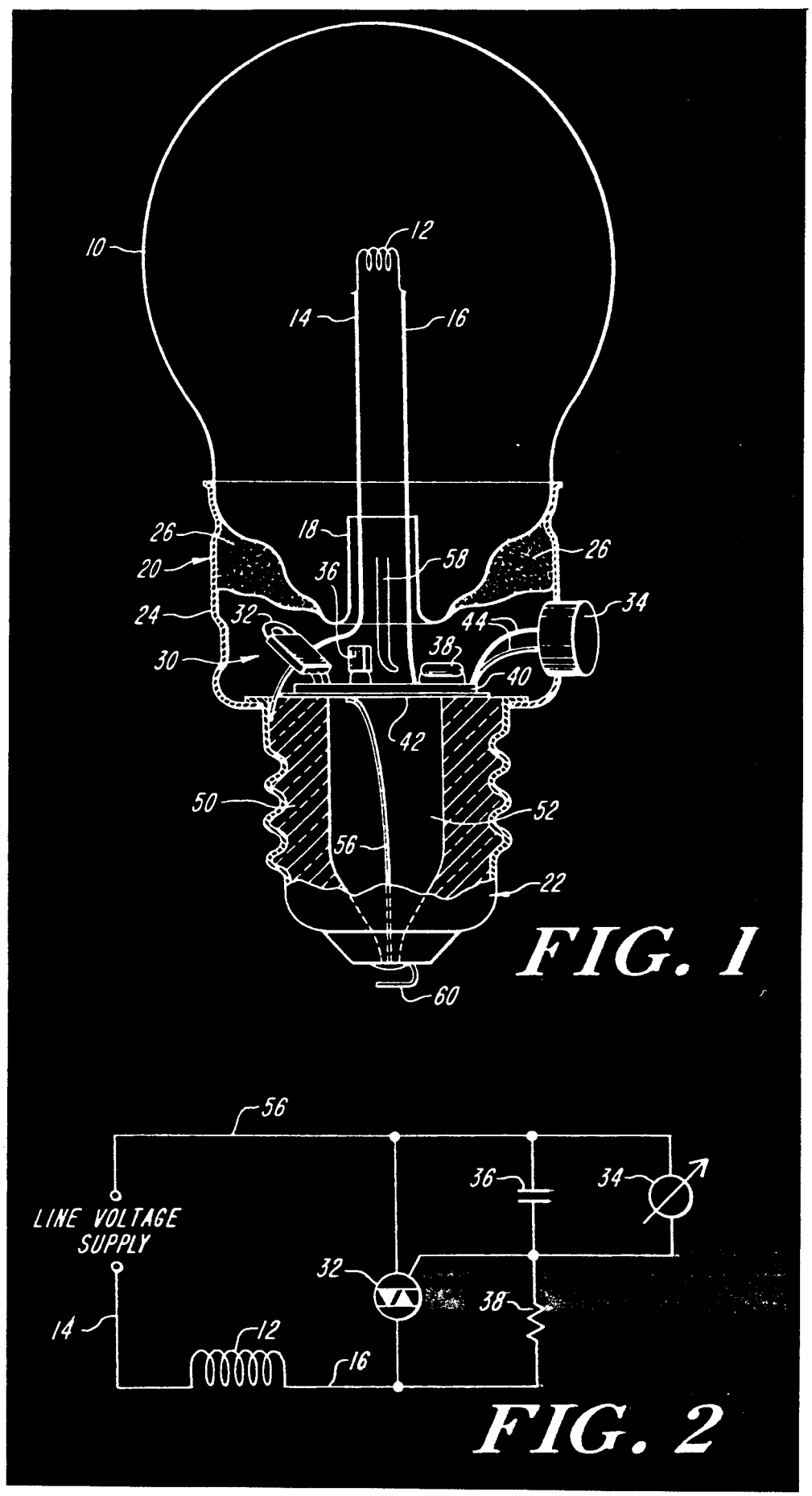

LAMP WITH INTEGRAL AUTOMATIC LIGHT CONTROL CIRCUIT

FIELD OF THE INVENTION

This invention relates to electric lamps having automatic on/off control circuits and, more particularly, to a lamp having a photosensor-actuated control circuit that is integrally mounted in the base thereof so that the lamp, including the control circuit, can be installed and operated in a conventional lamp socket.

BACKGROUND OF THE INVENTION

Automatic lamp control circuits are well known. Typically, a control circuit utilizes a photosensor to sense the ambient light level. The circuit turns the lamp on at night and off during the day. Such automatic control circuits are particularly useful for nightlights, outdoor lights such as street lights, and for lamps that are in inaccessible locations.

Prior art automatic lamp control circuits have had two basic configurations. In one configuration, the control circuit is a separate unit, and modification of the existing wiring to the lamp socket is required for installation. In the other configuration, the control circuit is contained in an adaptor which is mounted between the lamp socket and the lamp. The adaptor includes a plug for connection to the lamp socket and a socket for receiving the bulb. While such configurations are generally acceptable in operation, they entail the inconvenience and expense of separate units for light control. In many cases, the resulting combination is too large to fit into a fixture designed for the lamp.

A circuit for automatic control of a nightlight is disclosed in U.S. Pat. No. 4,588,926 issued May 13, 1986 to Pezzolo. The Pezzolo patent discloses a collar for mounting of a photocell and a printed circuit board. The collar slips over the base of a lamp and is attached around the neck of the bulb. Because the collar is external to the lamp, an adaptor is required to implement the disclosed circuit. A nightlight utilizing an adaptor which apparently includes a photosensor control circuit is disclosed in Design Patent No. 288,967 issued Mar. 24, 1987 to Naft.

It is a general object of the present invention to provide a lamp assembly with an integral automatic control circuit.

It is another object of the present invention to provide a lamp having a light control circuit mounted in the base thereof so that the lamp can be installed and operated in a conventional lamp socket.

It is a further object of the present invention to provide an automatically controlled lamp which is simple in construction and easy to use.

SUMMARY OF THE INVENTION

According to the present invention, these and other objects and advantages are achieved in a lamp assembly comprising a sealed lamp envelope including a lamp stem, the lamp envelope enclosing a filament having electrical leads that extend through the lamp stem, a lamp base affixed to the lamp envelope adjacent to the lamp stem, the lamp base including a connector for coupling electrical power to the filament, and an automatic light control circuit located in the lamp base and electrically connected between the connector and the filament. The light control circuit includes a photosensor for controlling the power delivered to the filament in response to a sensed ambient light level.

In a preferred embodiment, the lamp base includes a generally cup shaped portion affixed to the connector and to the lamp envelope. The light control circuit is mounted in the cup shaped portion on a circuit board. The photosensor is mounted in a hole in a sidewall of the cup-shaped portion of the lamp base.

According to another aspect of the invention, the integral automatic light control circuit provides a reduced voltage to the filament. As a result, the life of a conventional filament is extended. Alternatively, a shorter filament can be utilized.

BRIEF DESCRIPTION OF THE DRAWINGS

For a better understanding of the present invention together with other and further objects, advantages and capabilities thereof, reference is made to the accompanying drawings which are incorporated herein by reference and in which:

FIG. 1 is a cross sectional view of a lamp including an integral automatic control circuit in accordance with the present invention; and FIG. 2 is a schematic diagram of the control circuit.

DETAILED DESCRIPTION OF THE INVENTION

A lamp assembly in accordance with the present invention is shown in FIG. 1. The lamp assembly includes a sealed light-transmissive lamp envelope 10 having a filament 12 mounted therein. Electrical leads 14 and 16 coupled to filament 12 extend through a lamp stem 18 to a base 20. The base 20 includes a connector 22, typically of the screw in type, and a cup-shaped portion 24. A portion of lamp envelope 10 adjacent to lamp stem 18 extends into cup shaped portion 24 and is retained in position by basing cement 26. A light control circuit 30 is mounted in the cup shaped portion 24 of base 20. A metal base clip 60 is attached to an eyelet at the lower end of base connector 22.

A schematic diagram of a preferred light control circuit 30 is shown in FIG. 2. A quadrac 32 has its power leads coupled in series with the lamp filament 12 for connection to a supply voltage, typically AC line voltage. A photocell 34 is coupled between a control line of quadrac 32 and one side of the line voltage. A capacitor 36 is coupled in parallel with photocell 34, and a resistor 38 is coupled between the control line of quadrac 32 and the point of connection between quadrac 32 and lamp filament 12. The quadrac 32 comprises a triac and a diac in a single package. The circuit 30 shown in FIG. 2 provides simple yet effective automatic light control. Examples of suitable circuit components are as follows:

| Quadrac 32 | Teccor Type Q2004FT1 |
| Photocell 34 | Silonex Type NSL-4872 |
| Capacitor 36 | 0.047 microfarad |
| Resistor 38 | 39K ohms |

Referring again to FIG. 1, the quadrac 32, the capacitor 36 and the resistor 38 are mounted on a printed circuit board 40. Typically, the connector 22 includes glass insulation 50 having a hollow central region 52. The printed circuit board 40 is mounted in cup-shaped portion 24 and is supported by the glass insulation 50. Doublesided adhesive tape 42 holds the circuit board 40 on the glass insulation 50. The photocell 34 is mounted through a hole in a sidewall of cup shaped portion 24 and its leads 44 are connected to printed circuit board 40. The printed circuit board 40 can, if necessary, be provided with a clearance hole for the tip 58 of the lamp exhaust tubing.

Lead 14 from filament 12 is electrically connected to the outer conductor of connector 22. Lead 16 from filament 12 is connected to printed circuit board 40 and is electrically connected to quadrac 32 and resistor 38 as shown in FIG. 2. An electrical lead 56 is connected from the center conductor of connector 22 through hollow region 52 to printed circuit board 40. The lead 56 is electrically connected to quadrac 32, capacitor 36 and photocell 34 as shown in FIG. 2. The photocell 34 is mounted through the sidewall of cup-shaped portion 24 and is directed perpendicular to the lamp axis so that it does not receive light directly from filament 12. The photocell 34 can be hooded, if necessary, to further block light from filament 12. The photocell 34 provides a signal proportional to the ambient light level. The base clip 60 allows the user to optimize the orientation of the photosensor with respect to ambient light by rotating the lamp in its socket, while maintaining electrical contact.

The light control circuit 30 responds to the signal from photocell 34 to turn filament 12 off during the day and to turn filament 12 on at night. Triggering occurs at an ambient light level of 16 to 18 foot candles, the typical illumination at dusk. When light strikes the photocell 34, its internal resistance drops to a low value. A large voltage drop occurs across the resistor 38, and very little voltage is applied to capacitor 36. As the light level decreases, the internal resistance of photocell 34 increases. When the voltage drop across the capacitor 36 is sufficient, the quadrac 32 is triggered and conducts current through the filament 12.

In operation, the voltage drop across quadrac 32 in the on condition reduces the voltage supplied to lamp filament 12 in comparison with filaments operated directly from line voltage. The reduced filament voltage can be used to advantage. When a conventional lamp filament is designed to operate at a higher voltage and is used at lower voltage, the result is increased lamp life. The increase in life is due to the cooler operating temperature of the filament and its lower rate of tungsten evaporation. The circuit element values can be selected to produce a desired filament voltage lower than the line voltage. In this case, the filament can be shortened. A shortened filament has improved resistance to shock and vibration and increased efficiency due to reduced convective heat losses. Furthermore, in cases where the lamp is to be used in a reflector, a shortened filament more nearly approximates a point source located at the focal point of the reflector. The result is a more focused and more concentrated beam with improved light distribution.

The lamp assembly of the present invention including the light control circuit 30 mounted in the base of the lamp provides an extremely convenient and compact arrangement. The lamp assembly can be mounted directly in a conventional lamp socket without modification of the socket, without the requirement for a light control adaptor, and without the requirement for a separate light control assembly. The lamp assembly having automatic light control can directly replace a standard lamp. The light control circuit can be utilized with different lamp styles and different connector configurations.

While there has been shown and described what is at present considered the preferred embodiments of the present invention, it will be obvious to those skilled in the art that various changes and modifications may be made therein without departing from the scope of the invention as defined by the appended claims.

What is claimed is:

1. A lamp assembly comprising:
   a sealed lamp envelope including a lamp stem, said lamp envelope enclosing a filament having electrical leads that extend through said lamp stem;
   a lamp base affixed to said lamp envelope adjacent to said lamp stem, said lamp base including a connector for coupling electrical power to said filament and a cup-shaped portion affixed to said connector and located between said connector and said lamp envelope, said cup-shaped portion including a sidewall; and
   an automatic light control circuit located in said lamp base and electrically connected between said connector and said filament, said light control circuit including a photosensor for controlling the power delivered to said filament in response to a sensed ambient light level, said photosensor being mounted in the sidewall of the cup-shaped portion of said base.

2. A lamp assembly as defined in claim 1 wherein said light control circuit is mounted in said cup-shaped portion.

3. A lamp assembly as defined in claim 1 wherein said light control circuit includes a circuit board mounted in said cup-shaped portion.

4. A lamp assembly as defined in claim 1 wherein said control circuit further includes a control device coupled in series with said filament between said connector and one of said electrical leads, said control device being controlled by said photosensor.

5. A lamp assembly as defined in claim 1 wherein said light control circuit includes means for operating said filament in a low voltage condition, thereby permitting a short filament to be used.

6. A lamp assembly as defined in claim 1 wherein said photosensor is hooded to block light from said filament.

7. A lamp assembly as defined in claim 4 wherein said light control circuit further includes a quadrac coupled in series with said filament, and a resistor and a capacitor which, together with said photosensor, control said quadrac, said resistor, said quadrac and said capacitor being mounted on said circuit board in said base.

* * * * *

UNITED STATES PATENT AND TRADEMARK OFFICE
CERTIFICATE OF CORRECTION

PATENT NO. : 4,988,921

DATED : January 29, 1991

INVENTOR(S) : Elizabeth L. Ratner and David H. Fox

It is certified that error appears in the above-identified patent and that said Letters Patent is hereby corrected as shown below:

On the title page, change the Inventor's name from "Elizabeth L. Ratner" to --Elizabeth A. Levy--.

Signed and Sealed this

Eighth Day of September, 1992

Attest:

DOUGLAS B. COMER

*Attesting Officer*  *Acting Commissioner of Patents and Trademarks*